(12) United States Patent
Kambhampati et al.

(10) Patent No.: US 12,188,957 B2
(45) Date of Patent: Jan. 7, 2025

(54) ROLL EFFECT CORRECTION FOR OPTICAL SENSOR

(71) Applicant: HARMAN INTERNATIONAL INDUSTRIES, INCORPORATED, Stamford, CT (US)

(72) Inventors: Prithvi Kambhampati, Plano, TX (US); Nikhil Patel, Prosper, TX (US)

(73) Assignee: Harman International Industries, Incorporated, Stamford, CT (US)

( * ) Notice: Subject to any disclaimer, the term of this patent is extended or adjusted under 35 U.S.C. 154(b) by 743 days.

(21) Appl. No.: 17/361,149

(22) Filed: Jun. 28, 2021

(65) Prior Publication Data
US 2022/0034934 A1 Feb. 3, 2022

Related U.S. Application Data

(60) Provisional application No. 63/058,398, filed on Jul. 29, 2020.

(51) Int. Cl.
| | | |
|---|---|---|
| *G01P 15/093* | (2006.01) | |
| *B60R 21/0132* | (2006.01) | |
| *F16M 11/10* | (2006.01) | |
| *F16M 11/18* | (2006.01) | |
| *G01P 15/18* | (2013.01) | |
| *G02B 27/64* | (2006.01) | |
| *H04N 5/262* | (2006.01) | |
| *H04N 23/695* | (2023.01) | |
(Continued)

(52) U.S. Cl.
CPC ........ *G01P 15/093* (2013.01); *B60R 21/0132* (2013.01); *F16M 11/105* (2013.01); *F16M 11/18* (2013.01); *G01P 15/18* (2013.01); *G02B 27/648* (2013.01); *H04N 5/2628* (2013.01); *H04N 23/695* (2023.01); *B60R 2021/01327* (2013.01); *H04N 23/61* (2023.01); *H04N 23/6811* (2023.01); *H04N 23/6812* (2023.01); *H04N 23/683* (2023.01)

(58) Field of Classification Search
CPC ..... G01P 15/093; G01P 15/18; H04N 23/695; H04N 5/2628; H04N 23/61; H04N 23/683; H04N 23/6812; H04N 23/6811; B60R 21/0132; B60R 2021/01327; F16M 11/105; F16M 11/18; G02B 27/648
See application file for complete search history.

(56) References Cited

U.S. PATENT DOCUMENTS

| | | | |
|---|---|---|---|
| 7,400,950 B2 * | 7/2008 | Reich | G01P 3/806 701/4 |
| 7,970,512 B2 * | 6/2011 | Lu | B60T 8/172 701/91 |
| 10,969,784 B2 * | 4/2021 | Zhang | G05D 1/0088 |
(Continued)

FOREIGN PATENT DOCUMENTS

GB 2 523 807 A 9/2015

*Primary Examiner* — Elias Desta
(74) *Attorney, Agent, or Firm* — Artegis Law Group, LLP (57) ABSTRACT

Embodiments of the present disclosure set forth techniques for compensating for a roll effect for an optical sensor. The techniques include receiving sensor data from at least one sensor associated with the vehicle, detecting an amount of a roll of the vehicle based on the sensor data, generating a command based on the detected amount of roll, and controlling an orientation of the optical sensor based on the command.

19 Claims, 7 Drawing Sheets

(51) Int. Cl.
    *H04N 23/61*    (2023.01)
    *H04N 23/68*    (2023.01)

(56) References Cited

U.S. PATENT DOCUMENTS

| | | |
|---|---|---|
| 11,558,539 B2 * | 1/2023 | Kramarov .............. H04N 23/69 |
| 2010/0079101 A1 | 4/2010 | Sidman |
| 2019/0098191 A1 | 3/2019 | Enke et al. |
| 2020/0116195 A1 | 4/2020 | Chen et al. |
| 2020/0285325 A1 * | 9/2020 | Robinson ................ G06F 3/012 |

\* cited by examiner

ROLL EFFECT CORRECTION FOR OPTICAL SENSOR

CROSS-REFERENCE TO RELATED APPLICATION(S)

This application claims the benefit of U.S. Provisional Application No. 63/058,398, titled "ROLL EFFECT CORRECTION FOR FORWARD-FACING OPTICAL SENSOR," filed on Jul. 29, 2020. The subject matter of this application is incorporated by reference herein in its entirety.

BACKGROUND

Field of the Various Embodiments

The various embodiments relate generally to computer vision systems and processing and, more specifically, to techniques for roll effect correction for optical sensors.

Description of the Related Art

Many vehicles today can be equipped with computer vision capabilities and techniques. Computer vision techniques for vehicles include acquiring optical data (e.g., capture images) of the environment around the vehicle using optical sensors. For example, a forward-facing optical sensor could acquire optical data of the environment in front of the vehicle. Computer vision techniques using optical data of the front environment of the vehicle can have multiple uses, including, for example, people/object detection. Such techniques have multiple applications in driver assistance and/or autonomous driving contexts, including navigational assistance, collision avoidance, driver situational awareness, autonomous vehicle operation, and/or the like.

Typically, computer vision techniques for vehicle use are trained and/or developed using optical data obtained from four-wheeled vehicles that rarely experience any appreciable rolling (e.g., sedans, coupes, sport utility vehicles, minivans, vans, trucks, and/or the like). In such optical data, the view-up orientation of the optical sensor, and correspondingly the view-up orientation of the optical data, is substantially perpendicular with the road surface. When those computer vision techniques are applied to such optical data, the detection accuracy is typically very high. However, a drawback of such techniques is that those techniques are less effective when used with vehicles (e.g., motorcycles, scooters, etc.) that can roll more appreciably than four-wheeled vehicles. When a vehicle rolls relative to the road surface, the view-up orientation of the optical sensor, and correspondingly the view-up orientation of the optical data, is no longer substantially perpendicular with the road surface. When computer vision techniques are applied to such optical data, the detection accuracy is significantly lower. With vehicles that frequently experience rolling (e.g., motorcycles), the lower accuracy can occur quite often, making such computer vision techniques less ineffective when implemented on such vehicles.

A way to address the above drawback is that the effect of the vehicle roll (hereinafter the "roll effect") in the optical data can be corrected post-capture. For example, the captured optical data can be rotated in a direction opposing the vehicle roll, and then fitted into the aspect ratio of the optical sensor. A drawback of this response is that the rotation and fitting of the optical data results in loss of information for computer vision processing because the rotation and fitting can cause portions of the optical data to be cropped off. This loss of information results in less effective computer vision for driver assistance and/or the like.

What is needed are more effective techniques for correcting the roll effect in optical data captured by an optical sensor.

SUMMARY

An embodiment sets forth a computer-implemented method comprising receiving sensor data from at least one sensor associated with the vehicle, detecting an amount of a roll of the vehicle based on the sensor data, generating a command based on the detected amount of roll, and controlling an orientation of the optical sensor based on the command.

Further embodiments provide, among other things, one or more non-transitory computer-readable media and systems configured to implement the method set forth above.

At least one technical advantage of the disclosed techniques relative to the prior art is that the effect of vehicle roll on forward-facing and/or rear-facing optical data can be compensated for without cropping off information from the optical data. Accordingly, more orientation-appropriate optical data information can be provided to image processing and computer vision systems, resulting in higher recognition accuracy by those image processing and computer vision systems and thereby resulting in more effective driver assistance, autonomous driving, and/or the like. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
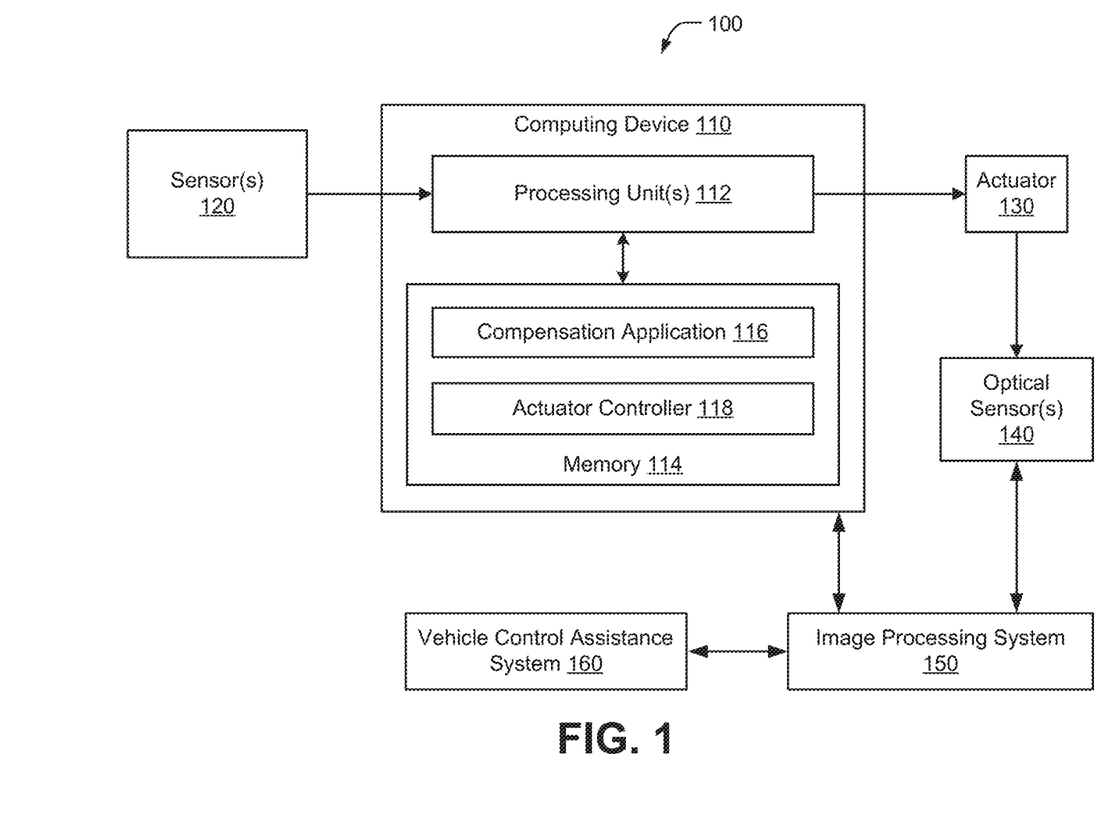
FIG. 1 is a conceptual block diagram of an optical sensor compensation system configured to implement one or more aspects of the various embodiments.

FIG. 1 is a conceptual block diagram of an optical sensor compensation system 100 configured to implement one or more aspects of the various embodiments. As shown, the optical sensor compensation system 100 includes a computing device 110, sensor(s) 120, actuator 130, and optical sensor 140. Computing device 110 includes one or more processing unit(s) 112, and memory 114. Memory 114 stores a compensation application 116 and an actuator controller 118. In some embodiments, sensor(s) 120, actuator 130, optical sensor 140, and computing device 110, are implemented at a vehicle.

Sensor(s) 120 can include any type of device that is capable of receiving and/or transmitting sensor data, including for example accelerometer data, angular velocity data, and so forth. More generally, the sensor data can include angular data of the vehicle, including but not limited to angular velocity, angular rotation or displacement relative to one or more axes and/or planes, and/or the like. In some embodiments, sensor(s) 120 include one or more sensors that provide other data, such as location data, image data, temperature data, etc. Computing device 110 can compute an amount of angular rotation or displacement corresponding to a roll of a vehicle on which sensor(s) 120 are mounted based on the acquired sensor data. Non-limiting examples of sensor(s) 120 include accelerometers, gyroscopes, magnetometers, computing devices, smartphones, navigation devices, imaging devices, Internet of Things (IoT) devices, radiofrequency identification (RFID) devices, traffic devices, global positioning devices, etc. In various embodiments, sensor(s) 120 can communicate with computing device 110 via a wired or wireless connection. In some embodiments, sensors 120 include an inertial measurement unit (IMU) that includes one or more sensors such as one or more accelerometer(s), one or more gyroscope(s), and/or one or more magnetometer(s).

As noted above, computing device 110 includes processing unit(s) 112 and memory 114. Computing device 110 can be a device that includes one or more processing units 112, such as a system-on-a-chip (SoC). In some embodiments, computing device 110 can be a head unit or other component included in a vehicle system. Generally, computing device 110 can be configured to coordinate the overall operation of optical sensor compensation system 100. The embodiments disclosed herein contemplate any technically-feasible system configured to implement the functionality of optical sensor compensation system 100 via computing device 110.

In various embodiments, computing device 110 can be located in various environments including, without limitation, road and/or land vehicle environments (e.g., consumer vehicle, commercial vehicle, bicycle, motorcycle, wheeled drone, etc.), aerospace and/or aeronautical vehicle environments (e.g., airplane, helicopter, spaceship, glider, aerial drone, etc.), nautical and submarine vehicle environments (e.g., boat, yacht, submarine, personal watercraft, nautical or submarine drone, etc.), and so forth.

Processing unit(s) 112 can be any technically-feasible form of processing device configured to process data and execute program code. Processing unit(s) 112 could include, for example, and without limitation, a system-on-chip (SoC), a central processing unit (CPU), a graphics processing unit (GPU), an application-specific integrated circuit (ASIC), a digital signal processor (DSP), a field-programmable gate array (FPGA), and so forth. Processing unit(s) 112 includes one or more processing cores. In operation, processing unit 112 can be a primary processor of computing device 110, controlling and coordinating operations of other system components.

Memory 114 can include a memory module or a collection of memory modules. In various embodiments, processing unit(s) 112 can execute compensation application 116 and/or actuator controller 118 to implement the overall functionality of the computing device 110 and, thus, to coordinate the operation of the optical sensor compensation system 100 as a whole. For example, and without limitation, sensor data acquired via the sensors 120 can be processed by compensation application 116 to generate a command. Processing unit(s) 112 can execute actuator controller 118 to drive actuator 130 based on the command generated by compensation application 116. In various embodiments, compensation application 116 can control the timing of sending the command to actuator controller 118. For example, compensation application 116 can send a command that includes an amount of angular rotation of a vehicle about a longitudinal axis of the vehicle to actuator controller 118, driving actuator 130 to orient optical sensor 140 by an amount that counters the amount of roll by the vehicle about the longitudinal axis. In some examples, compensation application 116 can send the command within 10 μs of receiving the roll data from sensor(s) 120. In some embodiments, compensation application 116 and actuator controller 118 are stored in a storage medium (not shown) of computing device 110 and loaded into memory 114 for execution. In some embodiments, compensation application 116 and actuator controller 118 can be combined into one application. Operation of compensation application 116 and actuator controller 118 is further described below.

Actuator 130 controls the orientation of optical sensor 140. In various embodiments, actuator 130 controls the orientation of optical sensor 140 along at least one axis (e.g., a longitudinal axis that is parallel to the longitudinal axis of the vehicle). In some embodiments, actuator 130 and actuator controller 118 can be included in a separate optical sensor orientation system (not shown). In such instances, actuator controller 118 can receive a command from computing device 110 and drive actuator 130 to rotate optical sensor 140 according to an angle (e.g., an amount of angular rotation of the vehicle about the longitudinal axis of the vehicle) included in the command. In some embodiments, actuator 130 controls one or more stabilizer components (not shown) that modify the orientation of optical sensor 140 relative to the road surface. Actuator 130 includes various mechanical, electro-mechanical, and/or other components (e.g., gears, actuators, hydraulic systems, pneumatic systems, etc.) that physically change the orientation of optical sensor 140.

Optical sensor(s) 140 includes at least one sensor that acquires optical data. In various embodiments, optical sensor 140 acquires optical data relating to the environment of a vehicle. In various embodiments, optical sensor 140 can include one or more cameras, such as RGB cameras, infrared cameras, thermal cameras, night vision cameras, depth cameras, and/or camera arrays, which include two or more of such cameras. Other optical sensors can include imagers and laser sensors. Further, optical sensor 140 can include one or more components of an imaging system, such as one or more components of a RADAR, a LiDAR system, and/or the like. In various embodiments, a vehicle can include one or more optical sensors 140. For example, a vehicle could include a forward-facing optical sensor (for capturing the environment in front of the vehicle) and/or a rear-facing optical sensor (for capturing the environment to the rear of the vehicle).

In various embodiments, optical sensor 140 is coupled to actuator 130. For example, optical sensor 140 could be mounted on a frame or a shaft that is coupled to and rotatable by actuator 130. In some embodiments, the vehicle could include multiple actuators 130 (e.g., an actuator 130 for each optical sensor 140).

In various embodiments, optical sensor 140 can send optical data to computing device 110 and/or another processing system. In such instances, computing device 110 and/or the other processing system analyzes the image data. For example, compensation system 100 could include an image processing system 150 that processes images to identify entities (e.g., objects, people, animals). In such instances, optical sensor 140 could send optical data in the form of a captured image to image processing system 150, where image processing system 150 analyzes the captured image using any technical feasible technique(s) (e.g., object recognition, computer optical vision, machine learning, etc.) in order to identify entities in the image. Image processing system 150 could send image analysis results (e.g., the objects recognized in the image) to a vehicle control assistance system 160. Image processing system 150 can be implemented via hardware, software, and/or a combination of hardware and software.

In some embodiments, compensation system 100 further includes a vehicle control assistance system 160. Vehicle control assistance system 160 can include one or more applications or sub-systems that provides assistance or takeover (e.g., information to a human driver, automated or autonomous vehicle operation) regarding operation of the vehicle, such as a driver assistance system, an autonomous driving system, an automated cruise control system, a collision avoidance system, and/or the like. Vehicle control assistance system 160 Vehicle control assistance system 160 can use the image analysis results to provide assistance or take-over based on the results (e.g., an alert to a human driver, autonomously brake and/or steer the vehicle). Vehicle control assistance system 160 can be implemented via hardware, software, and/or a combination of hardware and software. Image processing system 150 and/or vehicle control assistance system 160 can be an application or a sub-system within computing device 110 or implemented elsewhere in the vehicle (e.g., another application or sub-system in the vehicle head unit or in-vehicle computing system). In some embodiments, image processing system 150 and vehicle control assistance system 160 can be combined.

A vehicle can include a driver assistance system that helps a user operate the vehicle safely and assists in certain tasks associated with the vehicle, enabling the user to enjoy the ride more. Additionally or alternatively, a vehicle can include an autonomous driving system that operates the vehicle with little or no driver intervention. Computer optical vision systems have been key components in driver assistance systems and other vehicle systems, such as autonomous systems for four-wheel cars and trucks. When included in a driver assistance system, the computer optical vision system helps the user by providing feedback. Such feedback can include information about how quickly to enter a corner, or an alert to notify a driver who is not paying close attention to the road. In autonomous systems, the computer optical vision system enables the autonomous driving system to safely navigate an environment based on data acquired about the environment.

A computer optical vision system includes one or more optical sensors (e.g., still cameras, video cameras, LiDAR systems, etc.) that captures images of the surrounding environment. The computer optical vision system includes an image processing system that receives the one or more images captured by the optical sensors as an input and processes the image in order to operate the vehicle. For example, an autonomous vehicle could employ a computer optical vision system to accurately detect entities (e.g., vehicles, street buildings, pedestrians, road signs, etc.) in order to assist the autonomous vehicle to drive as safely as a human. Similarly, a driver assistance system could detect entities and notify a human driver of potential hazards.

Techniques for Roll Effect Correction

Figure 2:
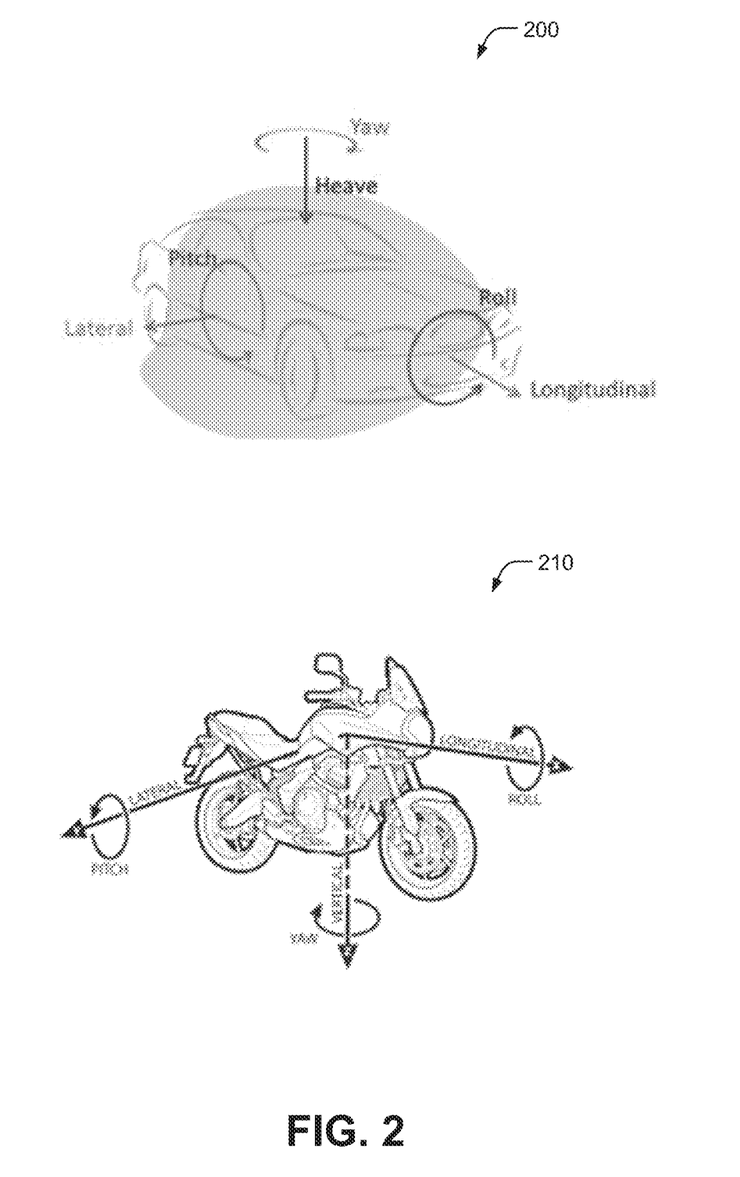
FIG. 2 are diagrams illustrating principal axes for a four-wheel vehicle and a motorcycle, according to various embodiments.

FIG. 2 are diagrams illustrating principal axes for a four-wheel vehicle and a motorcycle, according to various embodiments. As shown in FIG. 2, a four-wheel vehicle 200 has a lateral axis, a longitudinal axis, and a vertical axis. Four-wheel vehicle 200 rarely rolls or rarely rolls appreciably around the longitudinal axis during operation. As used herein, a roll of a vehicle is a rotation of the vehicle around the longitudinal axis, thereby causing an amount of angular rotation relative and orthogonal to a vertical axis of the vehicle, where that vertical axis is perpendicular to a horizontal plane and/or a plane of the road surface on which the vehicle is travelling. Instead, vehicle 200 typically rotates (i.e., is steered) around the vertical axis (e.g., the z-axis or heave axis). Vehicle 200 can also experience pitch around the lateral axis relative to a horizontal plane (e.g., when travelling uphill or downhill) and/or relative to the plane of the road surface. The vehicle can provide yaw control by controlling the motion around the vertical axis. Thus, optical sensors mounted to the front and/or rear of a four-wheel vehicle (e.g., where the field of view of the optical sensor is directed toward the front or rear of the vehicle) with a view-up orientation that is upright and parallel to the vertical axis of the vehicle have a view-up orientation that remains substantially perpendicular to the horizontal plane and/or the road surface. Image processing system 150 generally accurately detects entities in such images.

Figure 3:
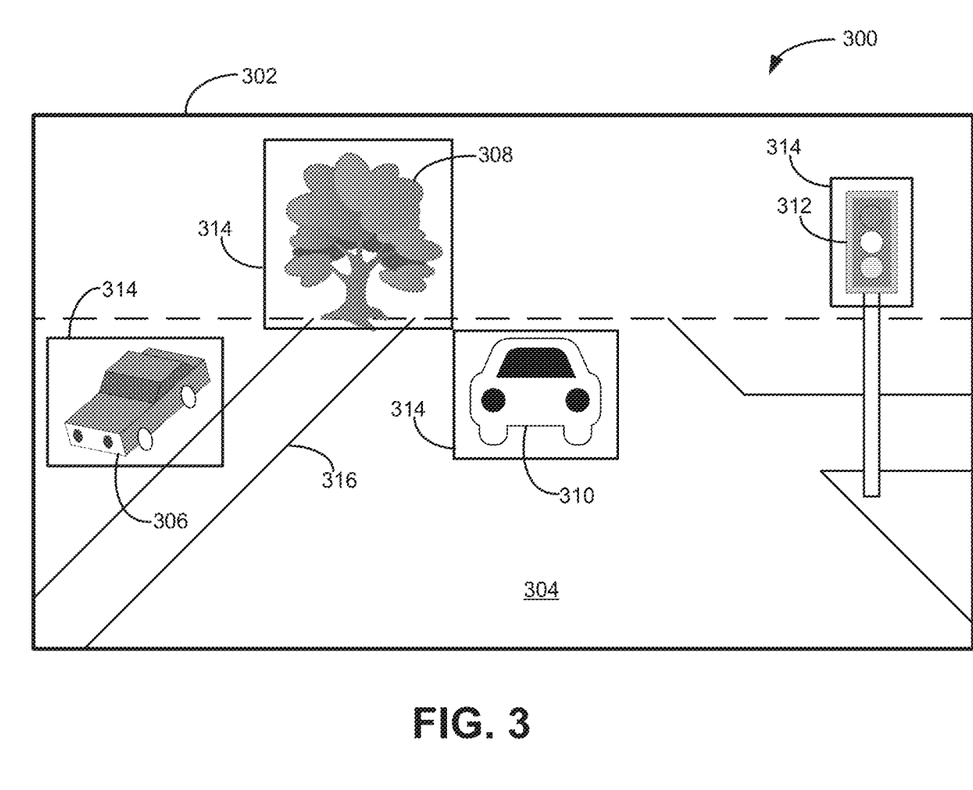
FIG. 3 illustrates an example image of a road environment captured without a roll effect, according to various embodiments.

FIG. 3 illustrates an example image of a road environment captured without a roll effect, according to various embodiments. As shown, image 300 is an image captured by a forward-facing optical sensor mounted on a vehicle. Image 300 is captured while the vehicle has no appreciable roll, and accordingly the view-up orientation of the optical sensor at the moment of capture, and correspondingly the view-up orientation of image 300, is substantially perpendicular to the road surface. Accordingly, image 300 is substantially free of a roll effect.

Image 300 has a predefined aspect ratio 302. Image 300 includes a road 304 in front of the vehicle. A vehicle 310 is on road 304 in front of the vehicle. Another vehicle 306 is on the opposite road, across a median 316. A tree 308 is located on the median 316. A traffic light 312 is located on the side of road 304. Image processing system 150 processing image can analyze image 300 and accurately recognize and detect vehicles 306 and 310, tree 308, and traffic light 312, as indicated by recognition bounding boxes 314.

Computer optical vision systems can also be implemented in other vehicles that provide controls along one or two other axes. For example, returning to FIG. 2, a motorcycle 210 also has a lateral axis, a longitudinal axis, and a vertical axis.

Vehicles such as motorcycle 210, submarines, aerial vehicles (including quadcopters), boats, and so forth, can roll around the longitudinal axis. Vehicle 210 can provide roll control to manage the amount of roll. Thus, the view-up orientations of optical sensors mounted to the front and/or rear of vehicle 210, mounted with a view-up orientation that is upright and parallel to the vertical axis of vehicle 210, are not perpendicular to the road surface while vehicle 210 is rolled about the longitudinal axis of vehicle 210.

Because a typical image processing system is trained using images where the view-up orientation of the optical sensor is substantially perpendicular to the road surface and/or the horizontal plane, the image processing system detects entities less accurately in images where the view-up orientation of the optical sensor is not perpendicular to the road surface and/or the horizontal plane. While such images can be corrected post-capture (e.g., by rotating the images and then fitting the images into the predefined aspect ratio required by the image processing system), such correction has the drawback of causing portions of the original image to be cropped off, resulting in less information for the image processing system.

Figure 4:
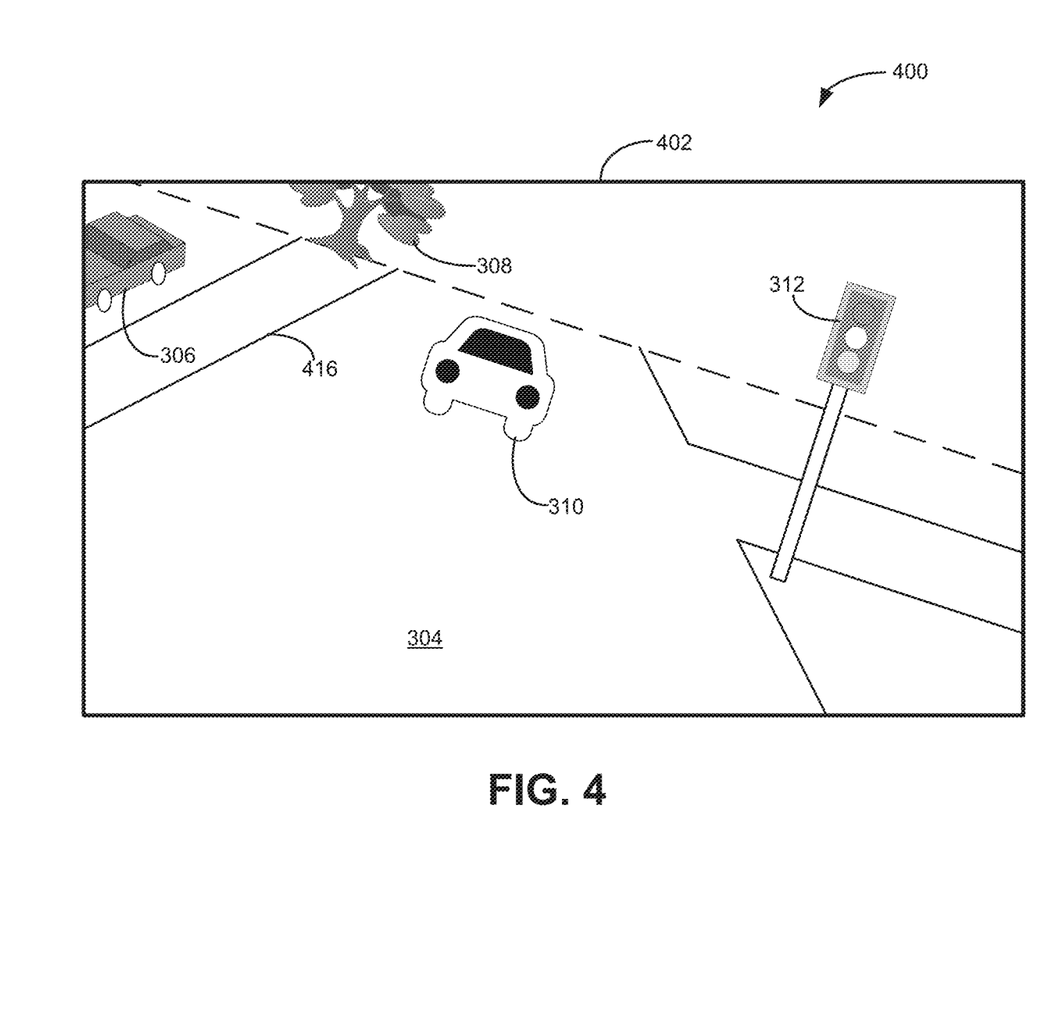
FIG. 4 illustrates an example image of the road environment captured with a roll effect, according to various embodiments.

FIG. 4 illustrates an example image of the road environment captured with a roll effect, according to various embodiments. As shown, image 400 is an image of the same road environment as in image 300, captured by the same forward-facing optical sensor as with image 300. Image 400 is captured while the vehicle is rolled counter-clockwise about the longitudinal axis the vehicle relative to the plane of the surface of road 304, and accordingly the view-up orientation of the optical sensor at the moment of capture, and correspondingly the view-up orientation of image 400, is not perpendicular to the road surface but is angled. Accordingly, image 400 has a roll effect.

Image 400 has a predefined aspect ratio 402 that is the same as aspect ratio 302. Shown in image 300 is road 304 in front of the vehicle. Image 400 includes vehicle 310 on road 304 in front of the vehicle. Image 400 also includes a portion of vehicle 306 on the opposite road across a median 416, and a portion of tree 308 on median 416. A traffic light 312 is located on the side of road 304.

Figure 5:
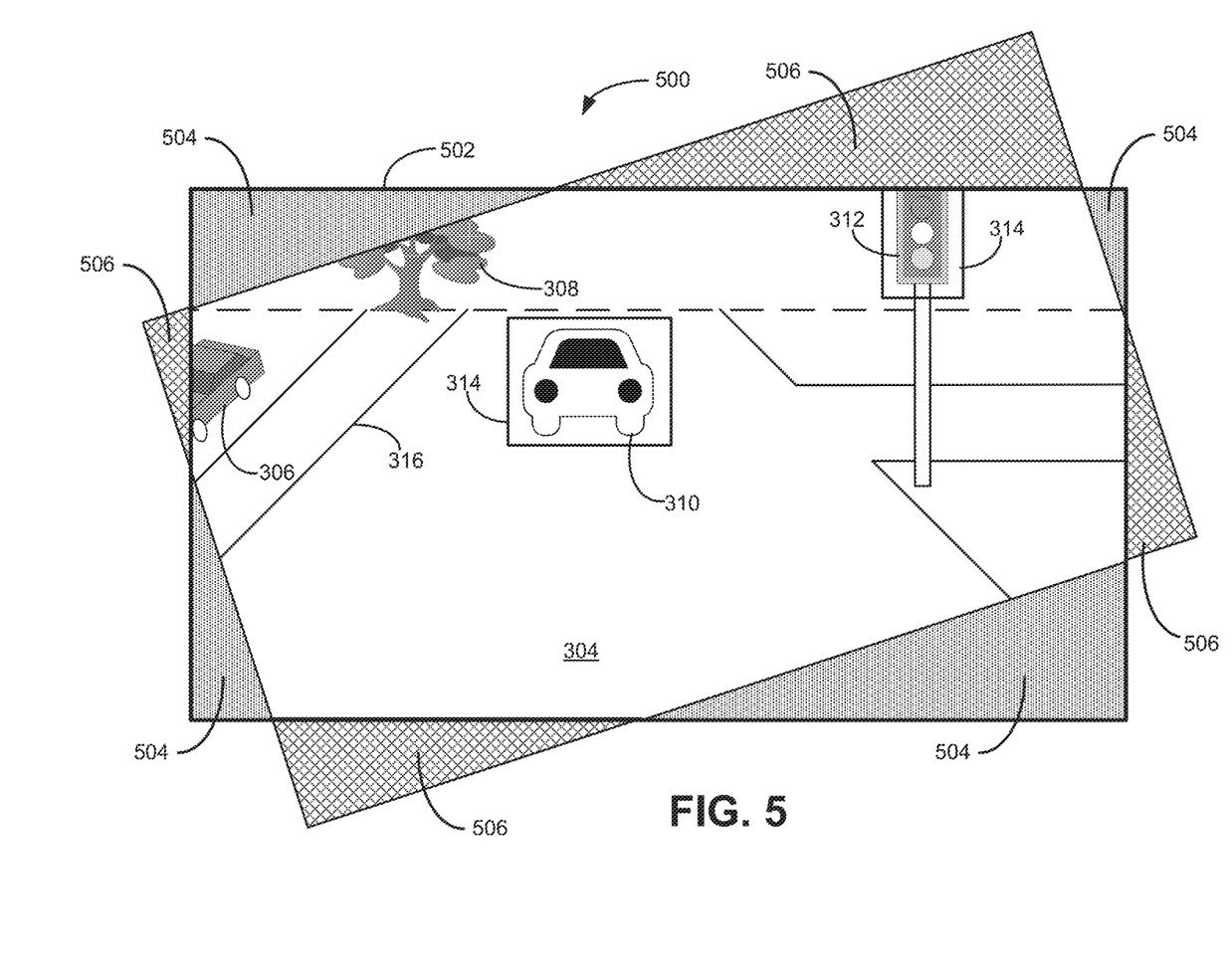
FIG. 5 illustrates the example image of FIG. 4 with roll effect correction according to conventional techniques.

FIG. 5 illustrates the example image of FIG. 4 with roll effect correction according to conventional techniques. FIG. 5 illustrates an image 500 that can be generated by rotating image 400 opposite the direction of the roll of the vehicle and then fitting the rotated image into aspect ratio 502, which is the same aspect ratio as aspect ratio 302/402. Thus, the view-up orientation of image 500 is substantially perpendicular to the surface of road 304. Because the rotated image is fitted into aspect ratio 502, portions 506 of the rotated image 400 that are outside of aspect ratio 502 are cropped off and not included in image 500. Instead, image 500 includes portions 504 that are blank (e.g., fully white or black) and correspond to portions of the aspect ratio 502 that are not covered by any part of the rotated image 400 fitted into aspect ratio 502 and are instead filled with blank content (e.g., a single color). Accordingly, image 500 contains less information than image 300 or 400. An image processing system can process image 500 and, because of the reduced amount of information in the image, detect entities less accurately and/or detect fewer entities in the image. For example, as shown in FIG. 5, image processing system 150 would detect just vehicle 310 and traffic light 312 in image 500, indicated by bounding boxes 314. Meanwhile, significant portions of vehicle 306 and tree 308 are not captured in image 500 and are accordingly not detected by image processing system 150.

To address the above drawbacks, optical sensor compensation system 100 performs roll effect correction prior to capture of an image. Compensation application 116 acquires sensor data from sensors 120, determines an amount of roll of the vehicle (e.g., an amount of angular rotation around the longitudinal axis of the vehicle), and generates an actuator command based on the amount of roll. Compensation application 116 sends the actuator command to actuator controller 118, which drives actuator 130 based on the actuator command to modify the orientation of optical sensor 140 to counteract the amount of roll. Optical sensor 140, with the modified orientation, can capture one or more images, which can be processed by image processing system 150.

In operation, compensation application 116 acquires sensor data from sensors 120. Compensation application 116 receives sensor data that can be used to detect an amount of roll of the vehicle about the longitudinal axis of the vehicle from sensors 120 (e.g., from an IMU and/or an accelerometer). The sensor data can include a roll angle parameter that directly measures an amount of roll (e.g., the amount of angular rotation relative to the axis perpendicular to the road surface) and a direction of roll (e.g., rolling clockwise or counterclockwise about the longitudinal axis of the vehicle relative to the vertical axis). Additionally or alternatively, the sensor data can include one or more parameters (e.g., angle relative to a horizontal plane, angular velocity, etc.) that can indirectly indicate rolling and can be used to calculate the amount and direction of roll.

Compensation application 116 can determine an amount and direction of roll based on the sensor data and accordingly determine or detect whether the vehicle is rolling. For example, if the sensor data includes a roll angle parameter, compensation application 116 can detect whether the vehicle is rolling from the roll angle parameter. Additionally or alternatively, compensation application 116 can calculate the amount and direction of roll from the sensor data and detect whether the vehicle is rolling from the calculated amount and direction of roll. In some embodiments, compensation application 116 detects rolling that exceeds a threshold and disregards rolling that does not exceed the threshold. For example, compensation application 116 could disregard amounts of roll that are smaller than a threshold (e.g., angular rotation of less than 5 degrees relative to the vertical axis).

In some embodiments, compensation application 116 filters the sensor data as part of the determination of the roll angle and direction. In some other embodiments, sensors 120 (e.g., accelerometer, IMU) can filter the sensor data before sending the sensor data (e.g., the roll amount and direction) to compensation application 116. The filtering can be performed with a low-pass filter, for example. In these embodiments, filtering the sensor data can remove noise amongst the sensor data and provide a more-accurate determination of the amount of roll. For example, sensors 120 could generate noise within the sensor data due to vibrations and jerks felt by the vehicle (e.g., driving over an uneven road surface).

To remove noise, sensors 120 and/or compensation application 116 can compute a simple moving average for incoming sensor data. For example, when sensors 120 filters incoming sensor data, with each iteration in a code loop, sensors 120 could drop the oldest value from the previous n datapoints and replaces that value with the latest reading. Sensors 120 can use Equation 1 to compute an average for the amount of roll (e.g., angular rotation of the roll).

$$d_{sm} = \frac{1}{n}\sum_{k=0}^{n-1} d_{m-i} \qquad (1)$$

Where $d_{sm}$ is the simple moving average at current data point $d_m$, and n is the number of previous data points taken into consideration. In one example, sensors 120 or compensation application 116 can compute the angular rotation of the roll as an average of the previous twenty data points acquired by the accelerometer. In some embodiments, sensors 120 and/or compensation application 116 can perform exponential smoothing on the sensor data in lieu of calculating a simple moving average. More generally, sensors 120 and/or compensation application 116 can aggregate, using any suitable algorithm or technique, any number of roll angle values in the sensor data before optical sensor 140 captures an image to determine an amount and direction of roll, so that the orientation of optical sensor 140 can be modified before the image is captured.

Using the new reading, sensors 120 can compute a new aggregate value. This new aggregate value is sent to compensation application 116, which uses the new aggregate value to generate an actuator command for actuator controller 118. Using aggregated values to drive the motion controller can ensure smooth operation of the motor.

In some embodiments, compensation application 116 acquires sensor data at a more frequent rate than the frame rate of optical sensor 140. For example, the frame rate of optical sensor 140 could be 30 frames per second, and sensors 120 could provide sensor data to compensation application 116 at a rate of 300 data points per second. When determining an amount and direction of roll before capture of a next frame by optical sensor 140, compensation application 116 can use the data points of sensor data acquired between that next frame and the immediately preceding frame of optical sensor 140. Those data points can be optionally processed (e.g., aggregated, average, moving average, exponentially smoothed) to determine the amount and direction of roll.

After determining the amount and direction of roll, compensation application 116 can generate an actuator command. The actuator command can include an angle by which to rotate optical sensor 140 and a direction of rotation. The angle and direction included in the actuator command are generated to counter the amount and direction of roll of the vehicle. For example, if the vehicle is rolling counterclockwise 30 degrees, the actuator command would include an angle of 30 degrees clockwise by which to rotate a forward-facing optical sensor 140. Compensation application 116 sends the actuator command to actuator controller 118. In some embodiments, if compensation application 116 detects that the vehicle is not rolling (e.g., the amount of roll is below a threshold or is otherwise zero or minimal), compensation application 116 can omit generating an actuator command.

Actuator controller 118 receives the actuator command and drives actuator 130 based on the actuator command. Actuator controller 118 activates actuator 130 to rotate optical sensor 140 by the angle and direction included in the actuator command, thereby re-orienting optical sensor 140 so that the view-up orientation of optical sensor 140 is substantially perpendicular to the road surface and/or the horizontal plane.

In some embodiments, compensation application 116 and actuator controller 118 can perform the roll effect correction process for multiple optical sensors. For example, if the vehicle includes a forward-facing optical sensor and a rear-facing optical sensor, compensation application 116 could determine the amount and direction of roll of the vehicle, and then determine respective actuator commands for the forward-facing optical sensor and the rear-facing optical sensor. Actuator controller 118 could drive respective actuators 130 based on the respective actuator commands. Additionally or alternatively, compensation application 116 can generate a command, and the actuator controller 118 drives the respective actuators 130 based on the command, with actuator controller 118 being responsible for interpreting the command into the proper amounts and directions of rotation based on whether the particular actuator is rotating a forward-facing optical sensor or a rear-facing optical sensor.

Figure 6:
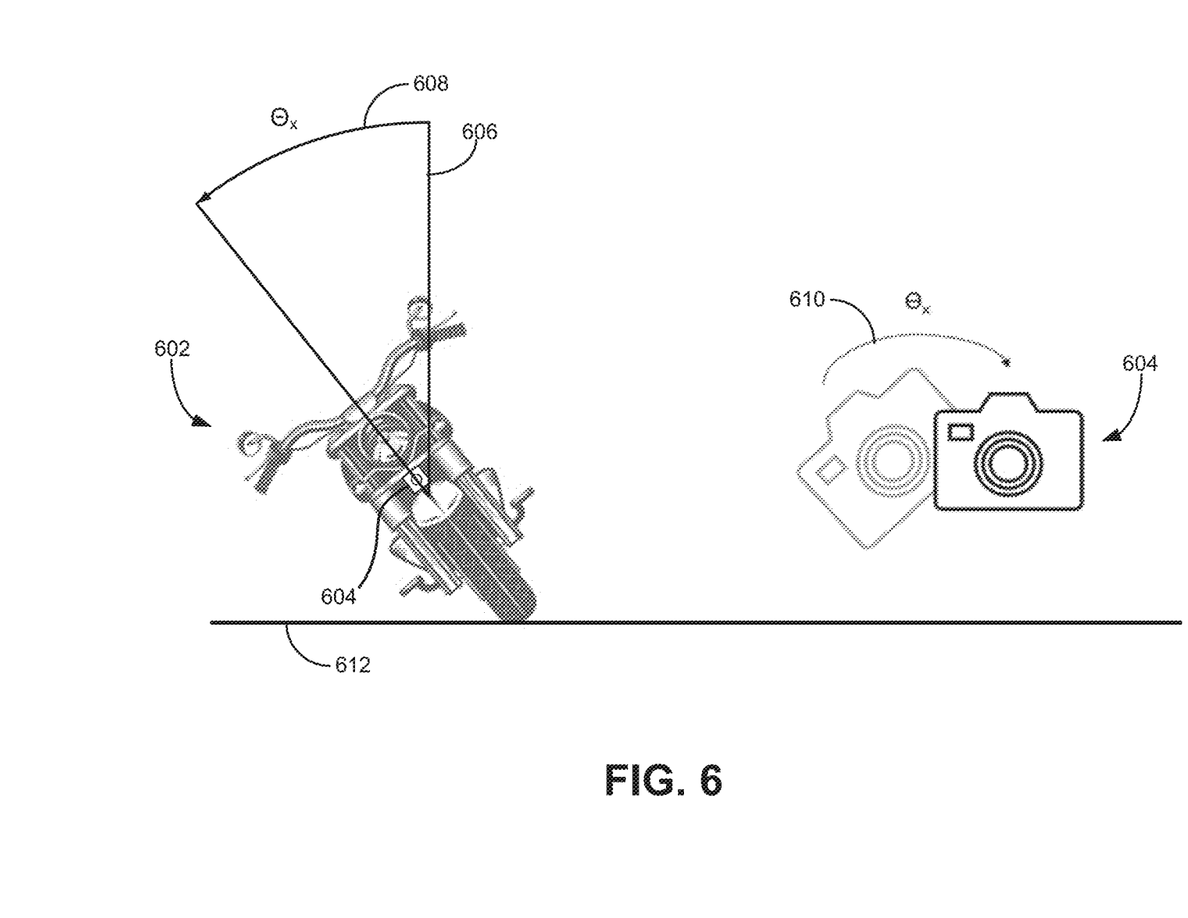
FIG. 6 illustrates a conceptual diagram of roll effect correction by modifying an orientation of an optical sensor, according to various embodiments.

FIG. 6 illustrates a conceptual diagram of roll effect correction by modifying an orientation of an optical sensor, according to various embodiments. FIG. 6 illustrates a front view of a motorcycle 602 that can roll about its longitudinal axis. Vehicle 604 has a forward-facing optical sensor 140 (e.g., a camera 604) that faces out toward the front environment of motorcycle 602 with a field of view aligned parallel to the longitudinal axis of motorcycle 602. When motorcycle 602 rolls, motorcycle 602 rolls by an angular rotation amount $\Theta_x$ 608 and in a direction (e.g., clockwise from motorcycle 602 facing forward as shown) relative to a vertical axis 606 that is perpendicular to road surface 612. Compensation application 116 can determine the angular rotation amount $\Theta_x$ 608 and the direction of roll, and generate a corresponding actuator command. Actuator controller 118 can drive an actuator 130 on-board motorcycle 602 to rotate 610 camera 604 by angular rotation amount $\Theta_x$ and in a direction (e.g., counterclockwise from camera 604 facing forward as shown) that counters the direction of the roll of motorcycle 602, thereby maintaining the view-up orientation of camera 604 to be perpendicular to road surface 612.

It should be appreciated that the angular rotation amount of the roll can be expressed as an angle relative to the vertical axis or as an angle relative to a horizontal plane or a plane of the road surface. In various embodiments, sensors 120 and/or compensation application 116 can determine an angle relative to the vertical axis from an angle relative to a horizontal plane or a plane of the road surface, or vice versa.

Figure 7:
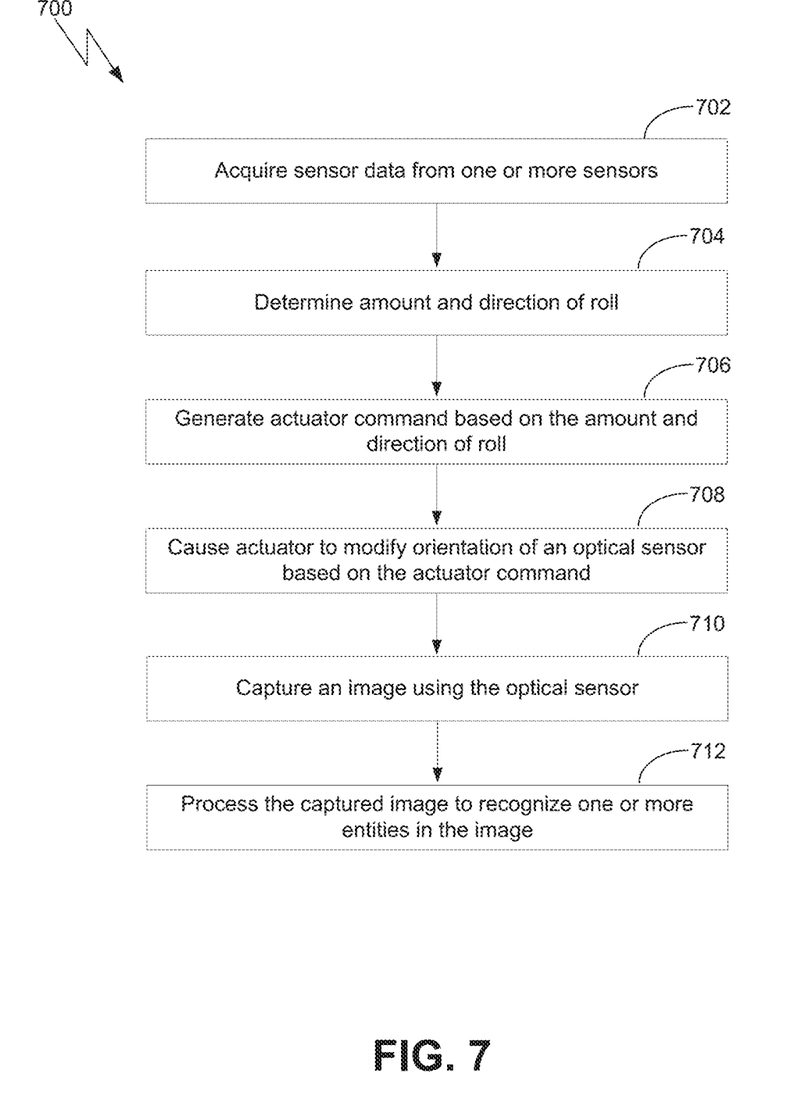
FIG. 7 illustrates a flow diagram of method steps to compensate for the roll effect for an optical sensor, according to various embodiments.

FIG. 7 illustrates a flow diagram of method steps to compensate for the roll effect for an optical sensor, according to various embodiments. Although the method steps are described with respect to the systems of FIGS. 1-6, persons skilled in the art will understand that any system configured to perform the method steps, in any order, falls within the scope of the various embodiments.

As shown, a method 700 begins at step 702, where compensation application 116 acquires sensor data from one or more sensors 120 (e.g., IMU, accelerometer) on a vehicle.

At step 704, compensation application 116 determines an amount and direction of roll of the vehicle. Compensation application 116 can read the data points in the sensor data and determine an amount of roll and a direction of roll directly from the sensor data (e.g., from a roll angle parameter in the sensor data). Additionally or alternatively, compensation application 116 can calculate an amount and direction of roll from the sensor data. Further additionally or alternatively, compensation application 116 can determine an amount and direction of roll from multiple data points in the sensor data. In some embodiments, sensors 120 and/or compensation application 116 can aggregate and/or filter data points in the sensor data before determining the amount and direction of roll. In some embodiments, compensation application 116 can determine if the amount of roll is less than a threshold amount (e.g., is zero, is less than a threshold amount of roll). If compensation application 116 determines that the amount of roll is less than the threshold amount, then compensation application 116 can omit steps 706 and 708 below.

At step 706, compensation application 116 generates an actuator command based on the amount and direction of roll. The actuator command includes an angle and a direction that is intended to counter the amount and direction of roll of the vehicle determined in step 704. For example, the actuator command can include an amount of rotation equal to the amount of roll of the vehicle, but in a direction opposite to the direction of roll of the vehicle. If compensation application 116 determines that the amount of roll is less than the threshold amount, then compensation application 116 can, instead of omitting steps 706 and 708 as described above, generate a null or no-op command.

At step 708, compensation application 116 causes an actuator to modify an orientation of an optical sensor on the vehicle based on the actuator command. Compensation application 116 sends the actuator command generated in step 706 to an actuator controller 118. Actuator controller 118 drives an actuator 130 based on the actuator command to modify an orientation of an optical sensor 140 (e.g., rotating optical sensor 140 to maintain a view-up orientation perpendicular to the road surface). If the command is a null or no-op command, actuator controller 118 can receive the null or no-op command and take no action in response.

At step 710, computing device 110 captures an image using the optical sensor. Computing device 110 and/or image processing system 150 can capture an image using optical sensor 140 whose orientation is modified in step 708. At step 712, image processing system 150 processes the captured image to recognize one or more entities in the image. Image processing system 150 in computing device 110 or elsewhere in the vehicle can process the image captured in step 710 to recognize one or more objects, etc. in the image. Image processing system 150 can send the processing results to a vehicle control assistance system 160.

In sum, the disclosed techniques compensate for the amount and direction of roll in a structure (e.g., a vehicle) when capturing optical data via a forward-facing or rear-facing optical sensor mounted on the vehicle. The techniques include acquiring sensor data from sensors on the vehicle. A compensation application processes the sensor data to determine an amount and direction of roll of the vehicle and to generate an actuator command based on the determined amount and direction of roll. An actuator controller drives an actuator based on the actuator command to modify the orientation of a forward-facing or rear-facing optical sensor mounted on the vehicle and coupled to the actuator, thereby re-orienting the view-up orientation of the optical sensor to be substantially perpendicular to the road surface while the vehicle is undergoing roll. The optical sensor whose orientation is modified by the disclosed techniques can then capture optical data, and those optical data, which exhibit reduced or eliminated roll effect due to the modified orientation of the optical sensor, can be provided to an image processor for processing.

At least one technical advantage of the disclosed techniques relative to the prior art is that the effect of vehicle roll on forward-facing and/or rear-facing optical data can be compensated for without cropping off information from the optical data. Accordingly, more orientation-appropriate optical data information can be provided to image processing and computer vision systems, resulting in higher recognition accuracy by those image processing and computer vision systems and thereby resulting in more effective driver assistance, autonomous driving, and/or the like. These technical advantages provide one or more technological advancements over prior art approaches.

1. In some embodiments, a computer-implemented method for controlling an optical sensor mounted on a vehicle comprises receiving sensor data from at least one sensor associated with the vehicle; detecting an amount of roll of the vehicle based on the sensor data; generating a command based on the detected amount of roll; and controlling an orientation of the optical sensor based on the command.

2. The method of clause 1, wherein controlling the orientation of the optical sensor comprises driving an actuator coupled to the optical sensor.

3. The method of clauses 1 or 2, wherein the actuator rotates the optical sensor based on the command.

4. The method of any of clauses 1-3, wherein the sensor data comprises angular data of the vehicle.

5. The method of any of clauses 1-4, further comprising determining a direction of roll of the vehicle based on the sensor data.

6. The method of any of clauses 1-5, wherein the amount of roll comprises an amount of angular rotation of the vehicle about a longitudinal axis of the vehicle.

7. The method of any of clauses 1-6, wherein generating the command based on the detected amount of roll comprises determining whether the detected amount of roll exceeds a threshold.

8. The method of any of clauses 1-7, wherein detecting the amount of roll based on the sensor data comprises aggregating a plurality of data points included in the sensor data.

9. The method of any of clauses 1-8, wherein detecting the amount of roll based on the sensor data comprises filtering the sensor data.

10. The method of any of clauses 1-9, wherein the command comprises an amount of angular rotation that counters the detected amount of roll.

11. In some embodiments, one or more non-transitory computer-readable storage media include instructions that, when executed by one or more processors, cause the one or more processors to perform the steps of receiving sensor data from at least one sensor associated with a vehicle; detecting an amount of roll based on the sensor data; generating a command based on the detected amount of roll; and controlling an orientation of an optical sensor mounted on the vehicle based on the command.

12. The non-transitory computer-readable storage media of clause 11, wherein controlling the orientation of the optical sensor comprises driving an actuator coupled to the optical sensor.

13. The non-transitory computer-readable storage media of clauses 11 or 12, wherein detecting the amount of roll based on the sensor data comprises detecting the amount of roll based on a plurality of data points in the sensor data between a next frame and an immediately preceding frame of the optical sensor.

14. The non-transitory computer-readable storage media of any of clauses 11-13, wherein the steps further comprise determining a direction of roll of the vehicle based on the sensor data.

15. The non-transitory computer-readable storage media of any of clauses 11-14, wherein the command comprises an amount of angular rotation that counters the detected amount of roll, and a direction that counters the direction of roll.

16. The one or more non-transitory computer-readable storage media of any of clauses 11-15, wherein the steps further comprise generating a second command based on the detected amount of roll; and controlling an orientation of a second optical sensor mounted on the vehicle based on the second command.

17. In some embodiments, a system comprises at least one sensor; an optical sensor; memory storing an application; and one or more processors that, when executing the application, is configured to receive sensor data from the at least one sensor; detect an amount of roll based on the sensor data; generate a command based on the detected amount of roll; and control an orientation of the optical sensor based on the command.

18. The system of clause 17, further comprising an actuator coupled to the optical sensor, and wherein the actuator is configured to rotate the optical sensor in response to the command.

19. The system of clauses 17 or 18, wherein the system is implemented at a vehicle, and the sensor data comprises angular data of the vehicle.

20. The system of any of clauses 17-19, wherein the at least one sensor comprises an inertial measurement unit.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling an optical sensor mounted on a vehicle, comprising:
   receiving sensor data from at least one sensor associated with the vehicle;
   filtering the sensor data to remove noise from the sensor data;
   detecting an amount of roll of the vehicle based on the filtered sensor data;
   generating a command based on the detected amount of roll; and
   controlling an orientation of the optical sensor based on the command;
   wherein the step of filtering the sensor data comprises;
      computing a moving average of a given number of previous data points included in the sensor data; or
      performing exponential smoothing on the sensor data.

2. The method of claim 1, wherein controlling the orientation of the optical sensor comprises driving an actuator coupled to the optical sensor.

3. The method of claim 2, wherein the actuator rotates the optical sensor based on the command.

4. The method of claim 1, wherein the sensor data comprises angular data of the vehicle.

5. The method of claim 1, further comprising determining a direction of roll of the vehicle based on the sensor data.

6. The method of claim 1, wherein the amount of roll comprises an amount of angular rotation of the vehicle about a longitudinal axis of the vehicle.

7. The method of claim 1, wherein generating the command based on the detected amount of roll comprises determining whether the detected amount of roll exceeds a threshold.

8. The method of claim 1, wherein detecting the amount of roll based on the sensor data comprises aggregating a plurality of data points included in the sensor data.

9. The method of claim 1, wherein the command comprises an amount of angular rotation that counters the detected amount of roll.

10. One or more non-transitory computer-readable storage media including instructions that, when executed by one or more processors, cause the one or more processors to perform the steps of:
    receiving sensor data from at least one sensor associated with a vehicle;
    filtering the sensor data to remove noise from the sensor data;
    detecting an amount of roll based on the filtered sensor data;
    generating a command based on the detected amount of roll; and
    controlling an orientation of an optical sensor mounted on the vehicle based on the command;
    wherein the step of filtering the sensor data comprises;
        computing a moving average of a given number of previous data points included in the sensor data; or
        performing exponential smoothing on the sensor data.

11. The non-transitory computer-readable storage media of claim 10, wherein controlling the orientation of the optical sensor comprises driving an actuator coupled to the optical sensor.

12. The non-transitory computer-readable storage media of claim 10, wherein detecting the amount of roll based on the sensor data comprises detecting the amount of roll based on a plurality of data points in the sensor data between a next frame and an immediately preceding frame of the optical sensor.

13. The non-transitory computer-readable storage media of claim 10, wherein the steps further comprise determining a direction of roll of the vehicle based on the sensor data.

14. The non-transitory computer-readable storage media of claim 13, wherein the command comprises:
    an amount of angular rotation that counters the detected amount of roll, and
    a direction that counters the direction of roll.

15. The one or more non-transitory computer-readable storage media of claim 10, wherein the steps further comprise:
    generating a second command based on the detected amount of roll; and
    controlling an orientation of a second optical sensor mounted on the vehicle based on the second command.

16. A system, comprising:
    at least one sensor;
    an optical sensor;
    memory storing an application; and
    one or more processors that, when executing the application, is configured to:
        receive sensor data from the at least one sensor;
        filtering the sensor data to remove noise from the sensor data;
        detect an amount of roll based on the sensor data;
        generate a command based on the detected amount of roll; and
        control an orientation of the optical sensor based on the command;
        wherein the step of filtering the sensor data comprises:
            computing a moving average of a given number of previous data points included in the sensor data; or
            performing exponential smoothing on the sensor data.

17. The system of claim 16, further comprising an actuator coupled to the optical sensor, and wherein the actuator is configured to rotate the optical sensor in response to the command.

18. The system of claim 16, wherein the system is implemented at a vehicle, and the sensor data comprises angular data of the vehicle.

19. The system of claim 16, wherein the at least one sensor comprises an inertial measurement unit.

* * * * *